United States Patent [19]
Landi et al.

[11] Patent Number: 5,617,595
[45] Date of Patent: Apr. 8, 1997

[54] CONTOURED SEAT CUSHION COMPRISED OF HONEYCOMB CORES

[75] Inventors: Curtis L. Landi; Susan L. Wilson, both of Sunnyvale; Peter M. Cazalet, Los Altos Hills, all of Calif.

[73] Assignee: Supracor Systems Corporation, San Jose, Calif.

[21] Appl. No.: 264,103

[22] Filed: Jun. 22, 1994

Related U.S. Application Data

[63] Continuation-in-part of Ser. No. 80,745, Jun. 22, 1993, Pat. No. 5,444,881, which is a continuation-in-part of Ser. No. 974,474, Nov. 12, 1992, abandoned, which is a continuation-in-part of Ser. No. 717,523, Jun. 19, 1991, Pat. No. 5,180,619, which is a continuation-in-part of Ser. No. 446,320, Dec. 4, 1989, Pat. No. 5,039,567.

[51] Int. Cl.⁶ .............................. A47C 27/08; B23B 3/12
[52] U.S. Cl. .................... 5/653; 5/654; 428/73; 428/116; 297/452.41
[58] Field of Search ............... 5/653, 654, 448, 5/652; 297/DIG. 3, 452.21, 452.23, 452.41, 452.42; 428/116, 118, 73, 131

[56] References Cited

U.S. PATENT DOCUMENTS

| | | | |
|---|---|---|---|
| 5,039,567 | 8/1991 | Landi et al. | 428/116 |
| 5,163,737 | 11/1992 | Navach et al. | 5/653 |
| 5,180,619 | 1/1993 | Landi et al. | 428/116 |
| 5,203,607 | 4/1993 | Landi | 297/DIG. 1 |
| 5,317,773 | 6/1994 | Graebe | 5/653 |
| 5,444,881 | 8/1995 | Landi et al. | 5/653 |
| 5,496,610 | 3/1996 | Landi et al. | 428/116 |

*Primary Examiner*—Alexander Grosz
*Attorney, Agent, or Firm*—Claude A. S. Hamrick

[57] ABSTRACT

An improved anatomical support apparatus including an upper substrate engagable with a body surface of a user, and a support substrate attached to the upper substrate. The upper substrate having a first honeycomb core formed of undulated strips of resilient thermoplastic material, thermal compression bonded together to form cell walls defining a plurality of contiguous regularly shaped cells. Each of the cell walls having an upper extremity and a lower extremity. Each upper and lower extremity of the first core forming either a planar or a contoured surface. The upper substrate further includes means for maintaining the first core in its expanded configuration. A stack having at least one support substrate attached to either the upper or the lower extremity of the first core. A support substrate including a second honeycomb core formed of undulated strips of resilient thermoplastic material, thermal compression bonded together to form cell walls defining a plurality of contiguous regularly shaped cells. Each of the cell walls of the second core having an upper extremity and a lower extremity. Each upper and lower extremity of the second core forming either a contoured or a planar surface. In addition, the support substrate also includes means for maintaining the second core in its expanded configuration. The first and the second cores being anisotropically flexible and capable of stabilizing and spreading a load exerted thereupon by the user of the support apparatus.

In a preferred embodiment the support apparatus comprises a seat cushion in which at least the upper substrate defines a contoured surface adapted to support prominences in the body of a seated user.

7 Claims, 13 Drawing Sheets

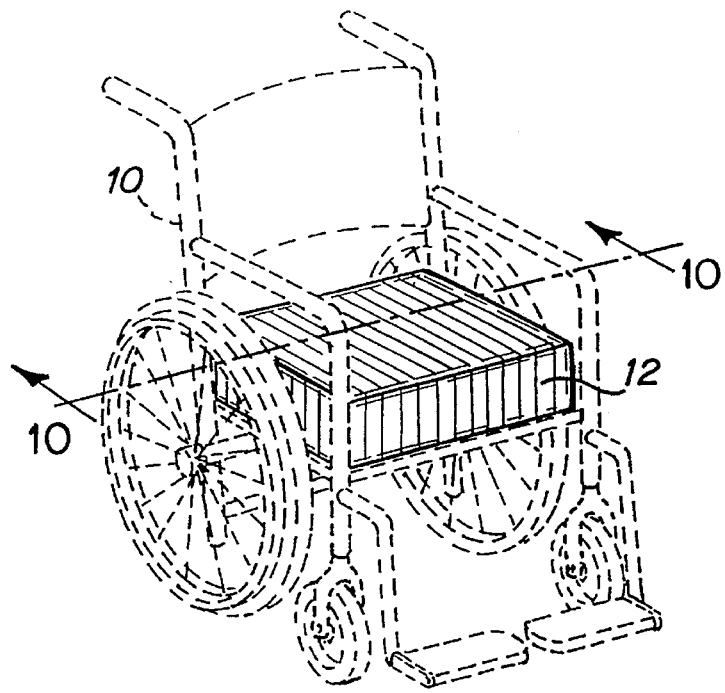
Fig_1
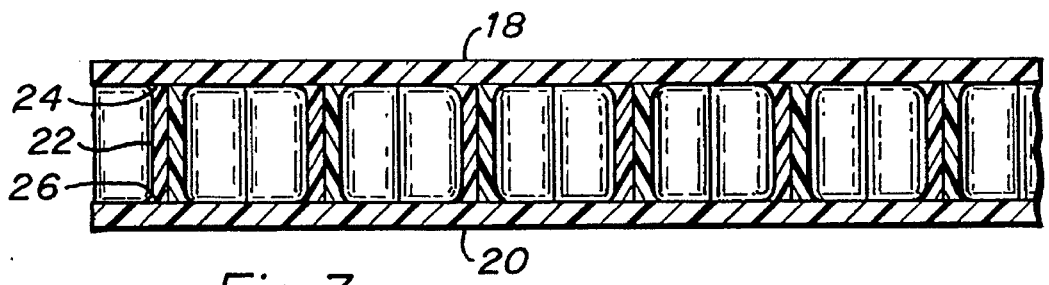
Fig_3
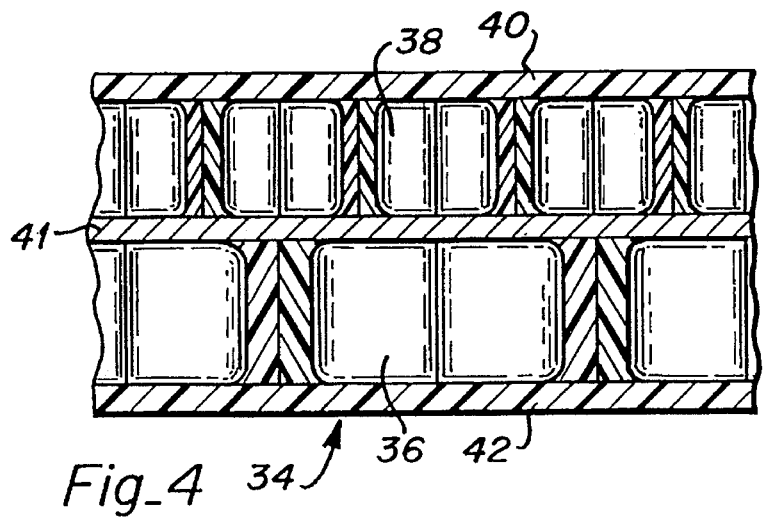
Fig_4

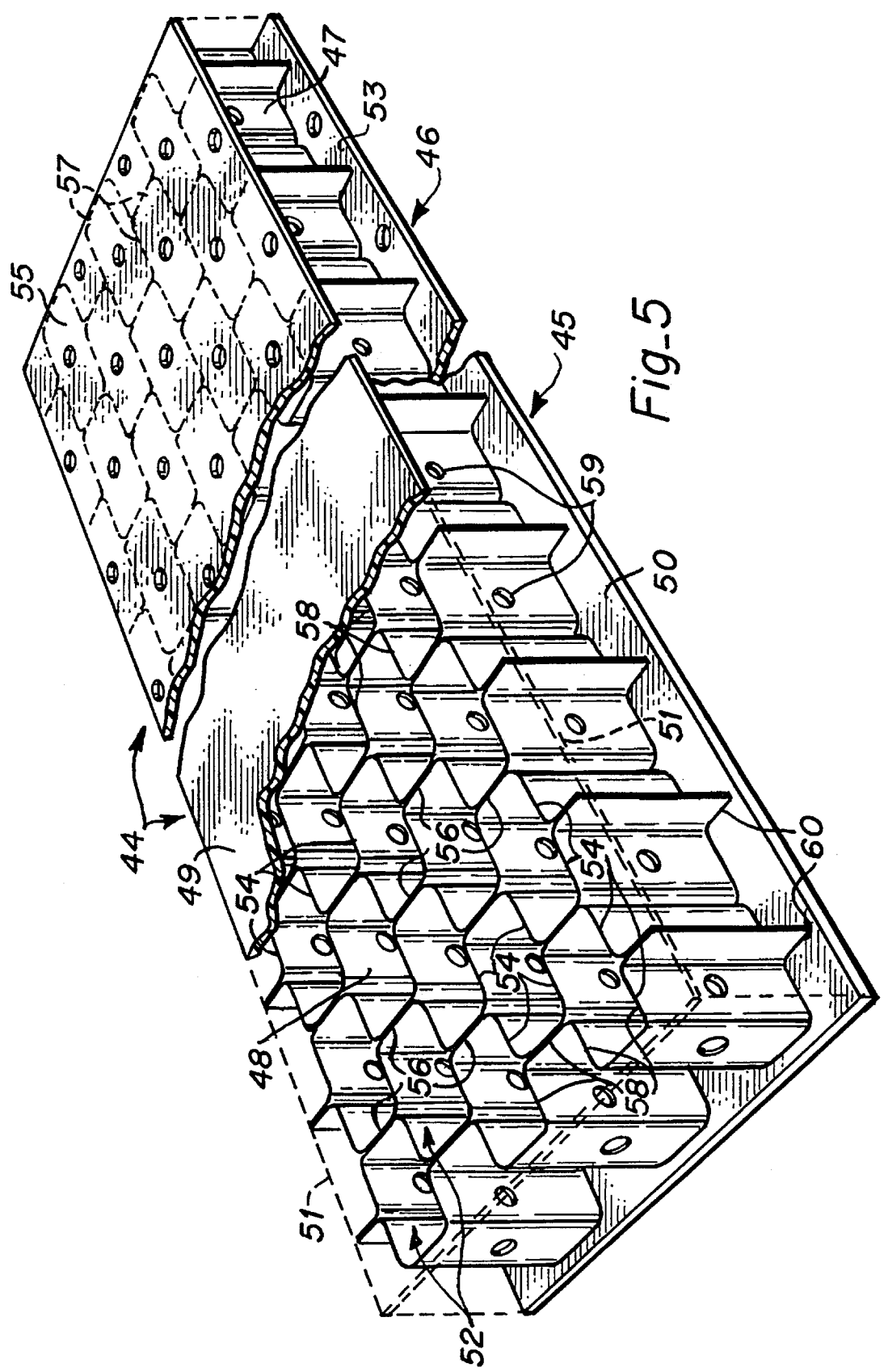

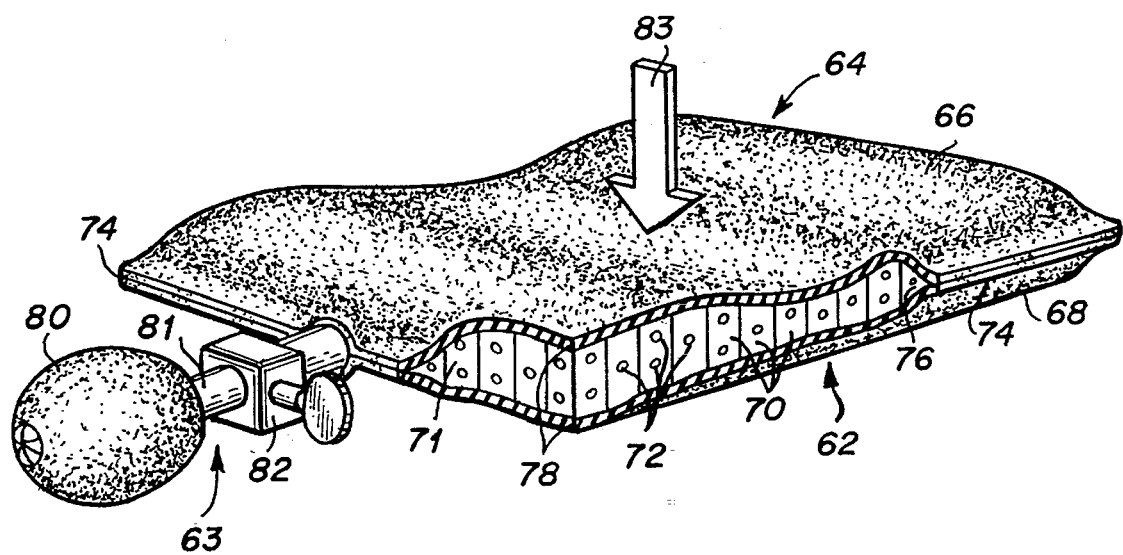
Fig_6

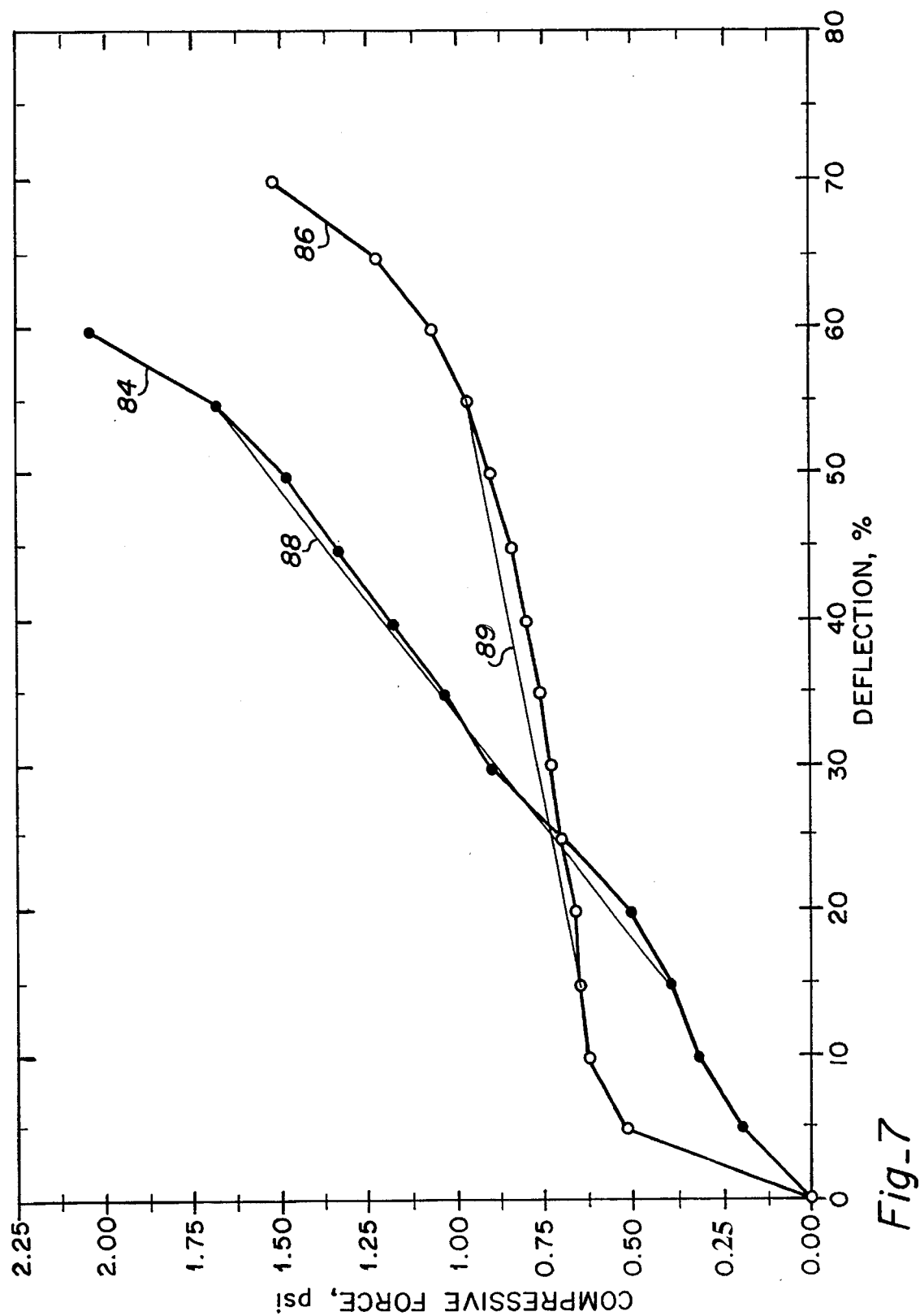
Fig_7

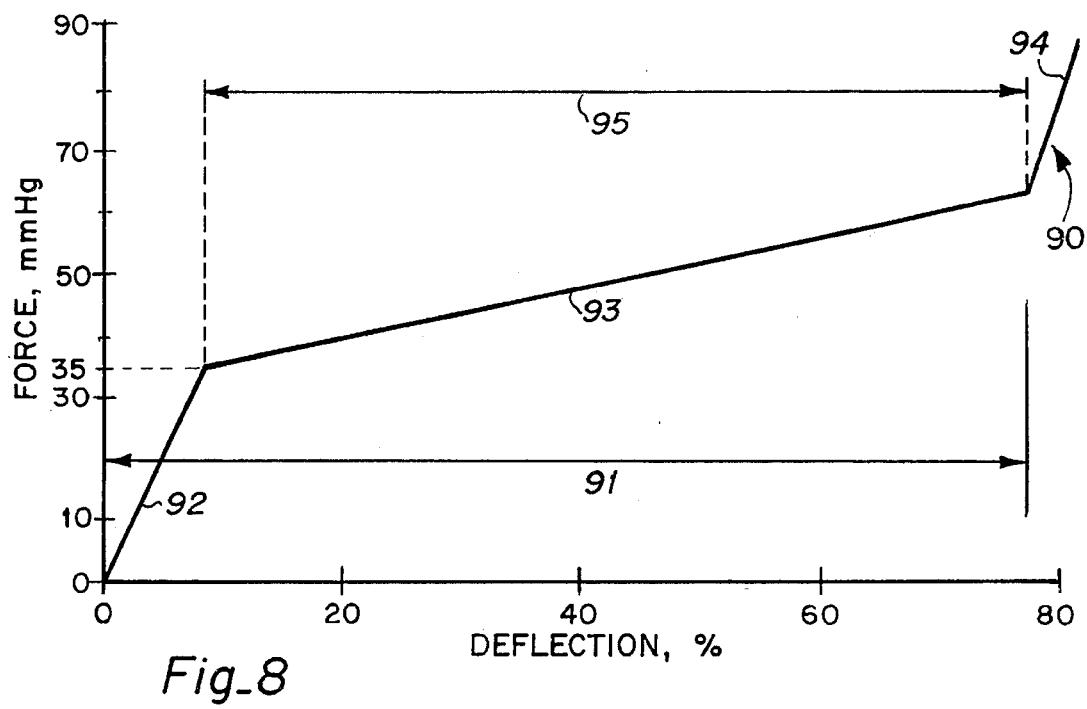
Fig_8
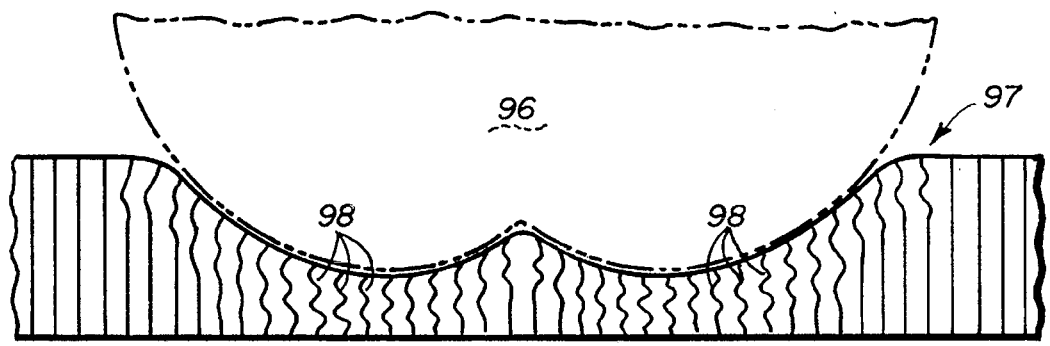
Fig_9

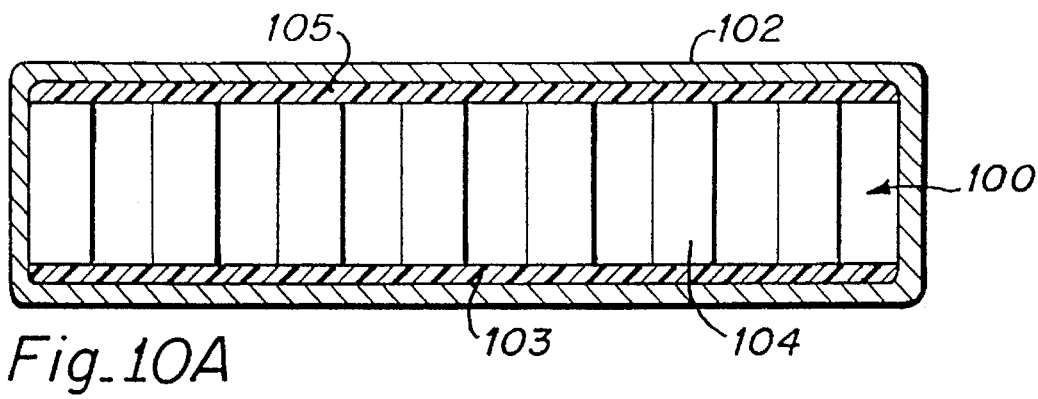
Fig_10A
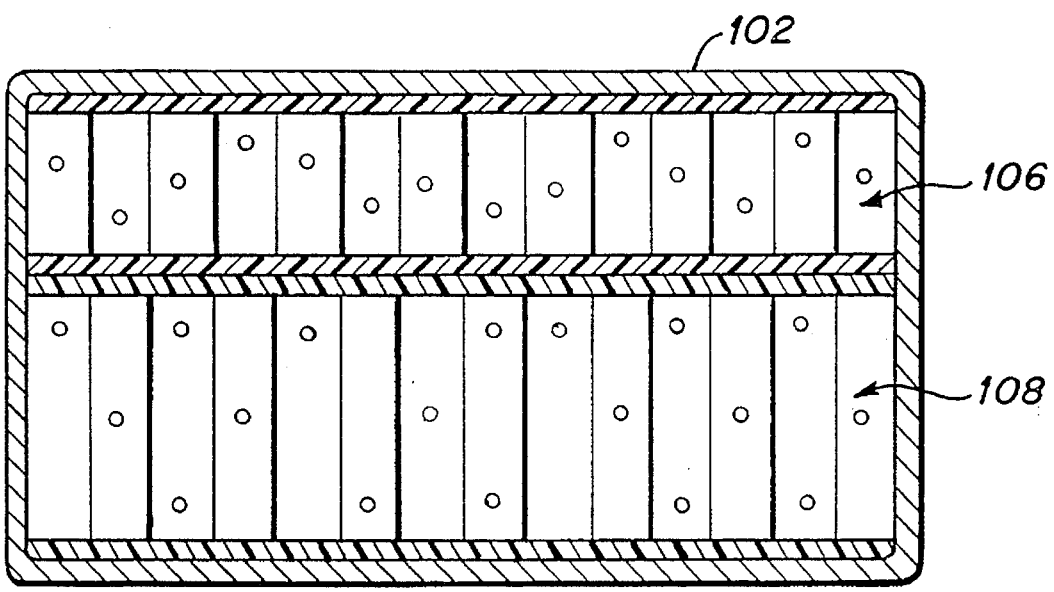
Fig_10B
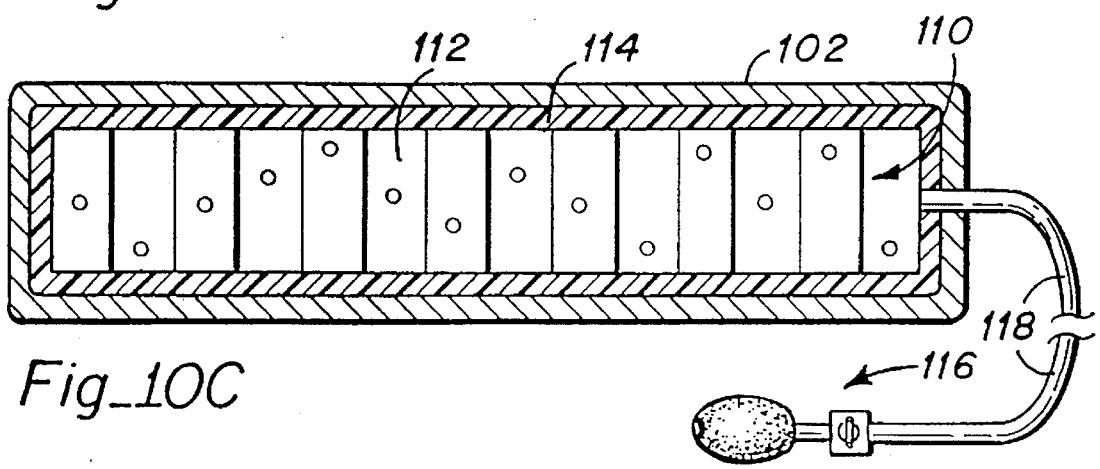
Fig_10C

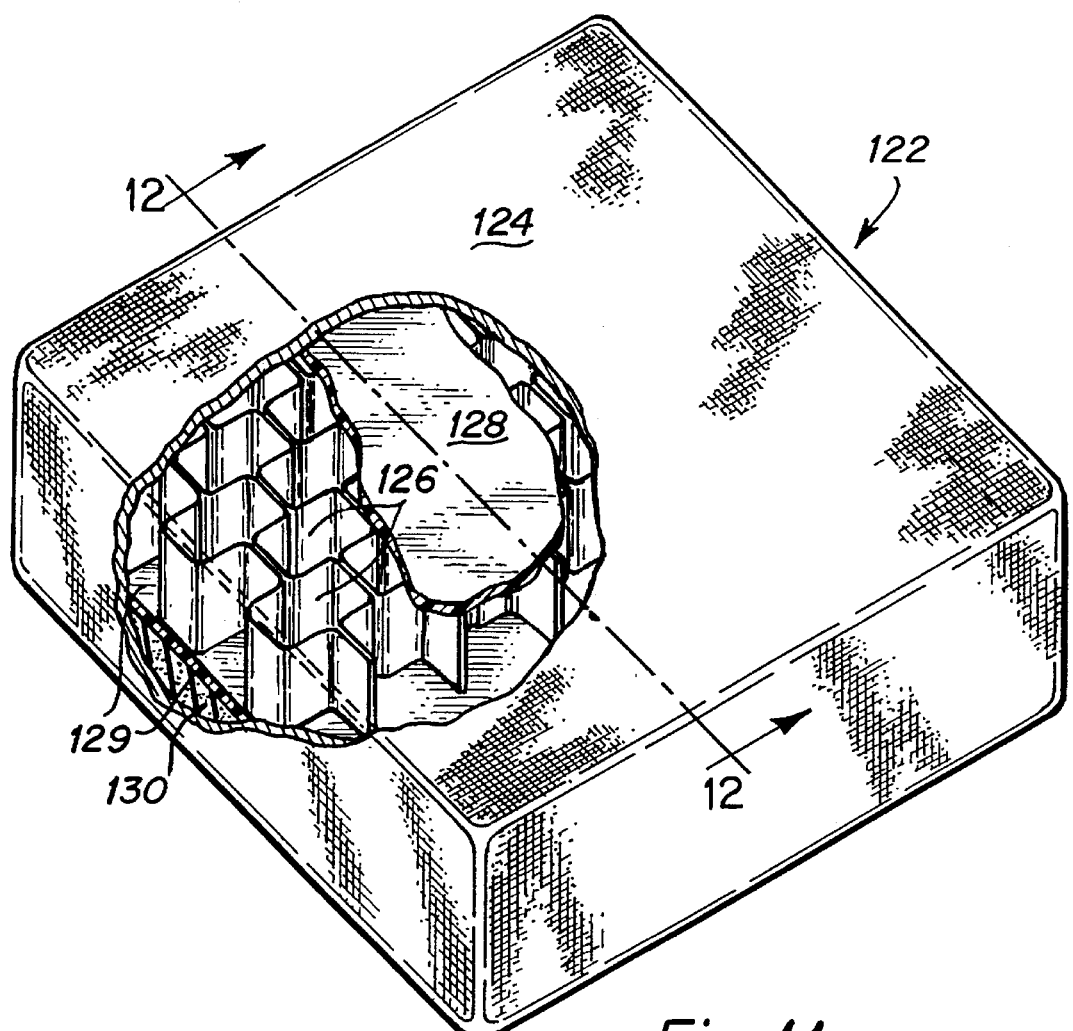
Fig_11
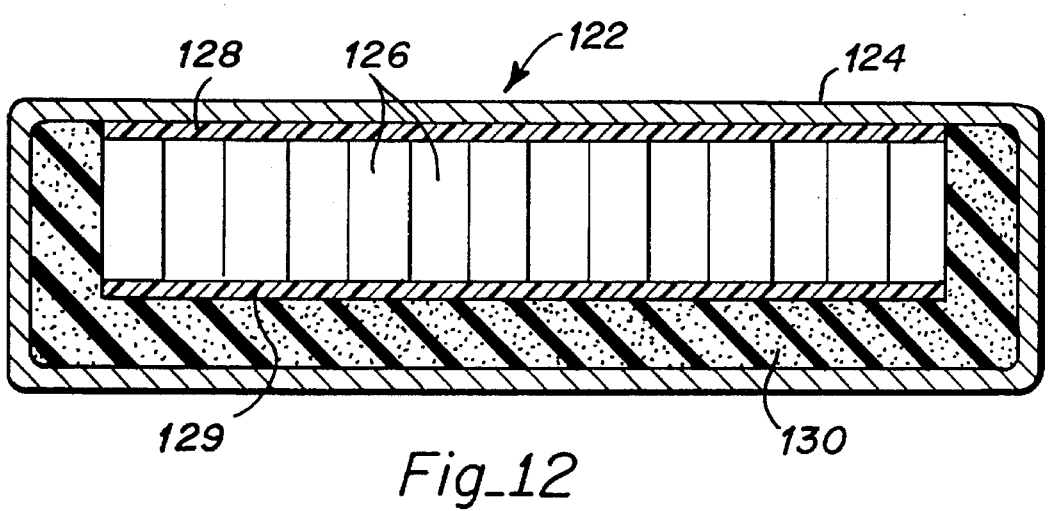
Fig_12

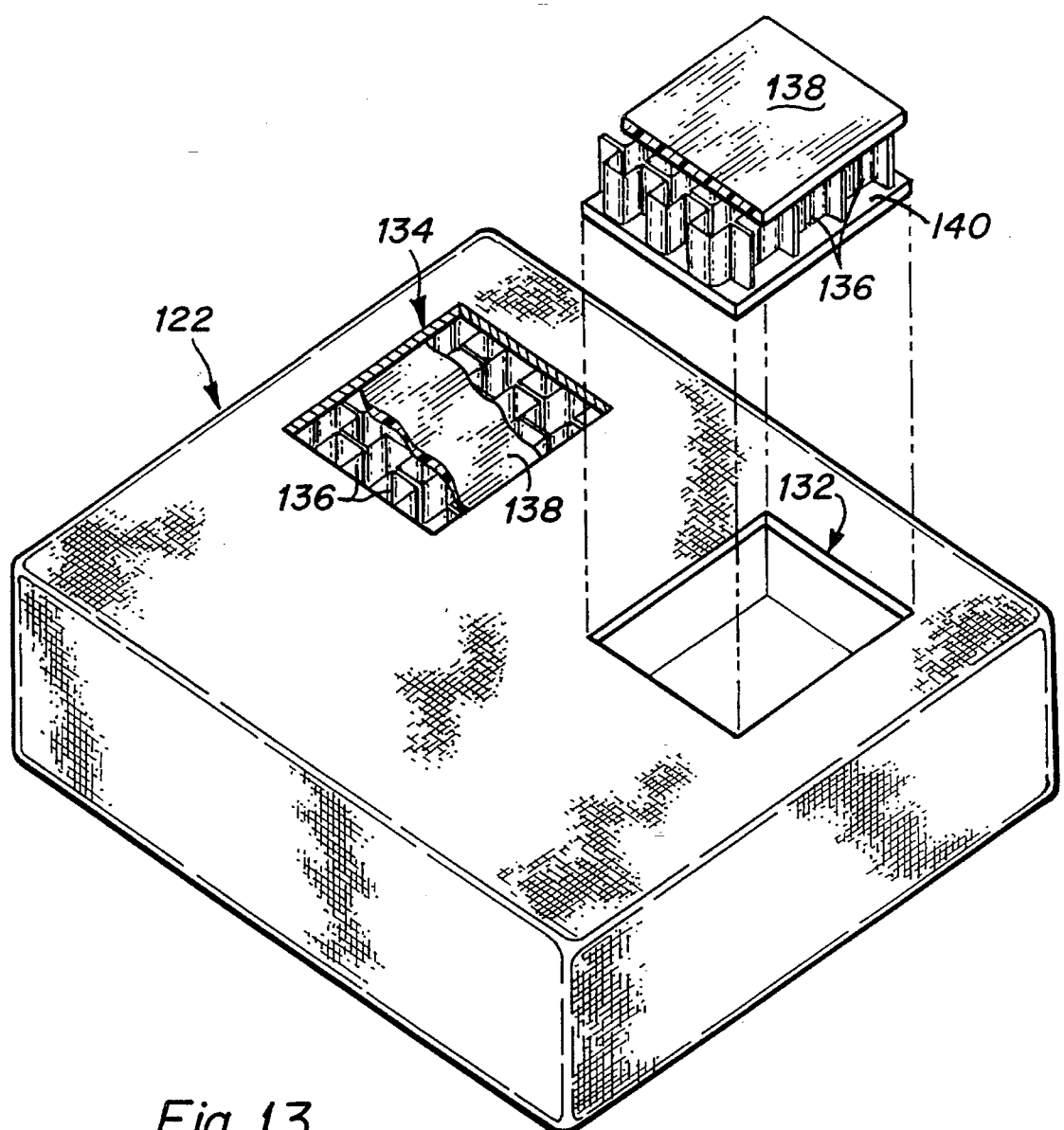
Fig_13

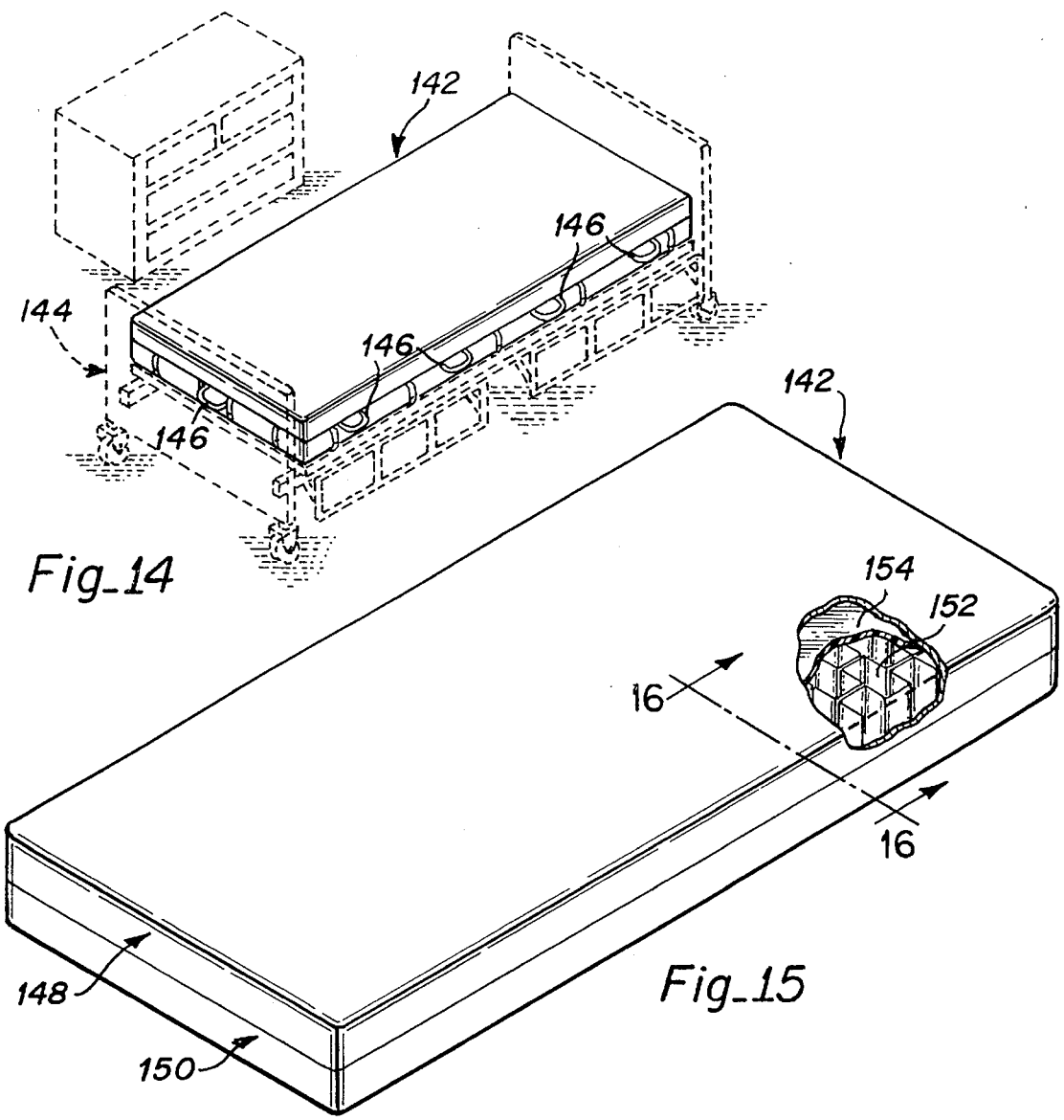

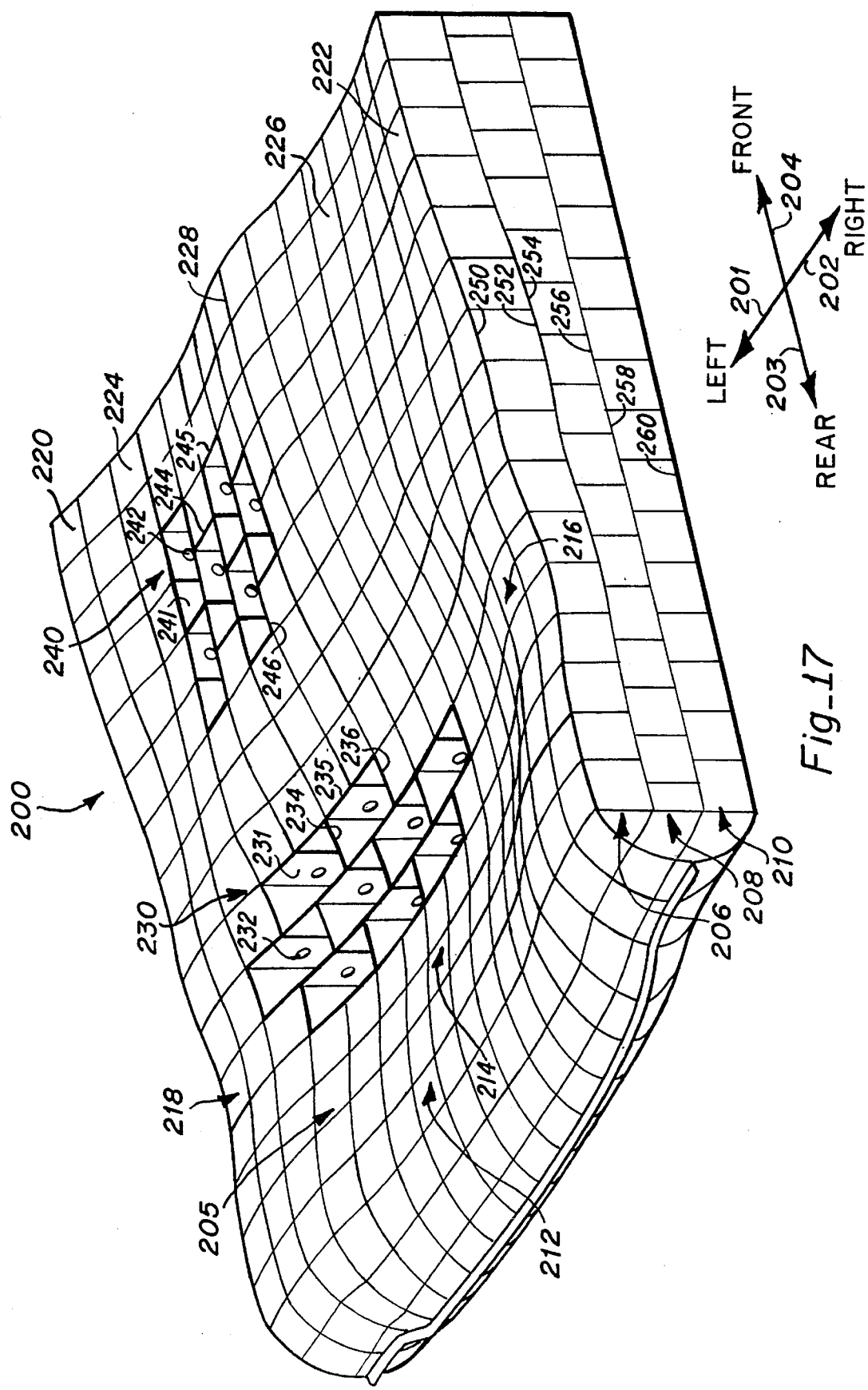

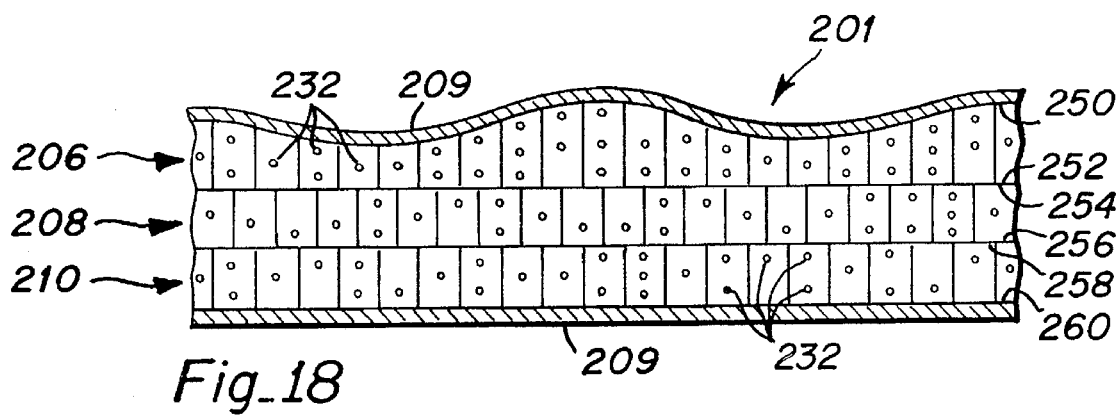
Fig_18
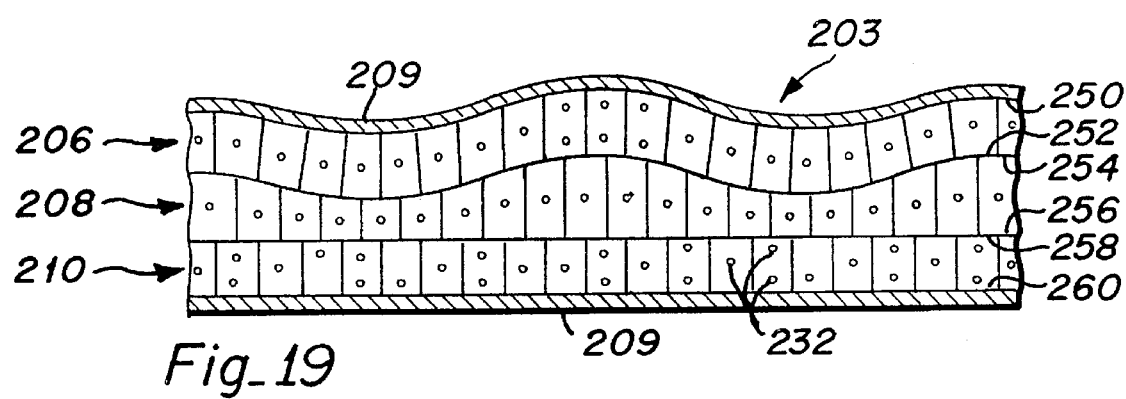
Fig_19
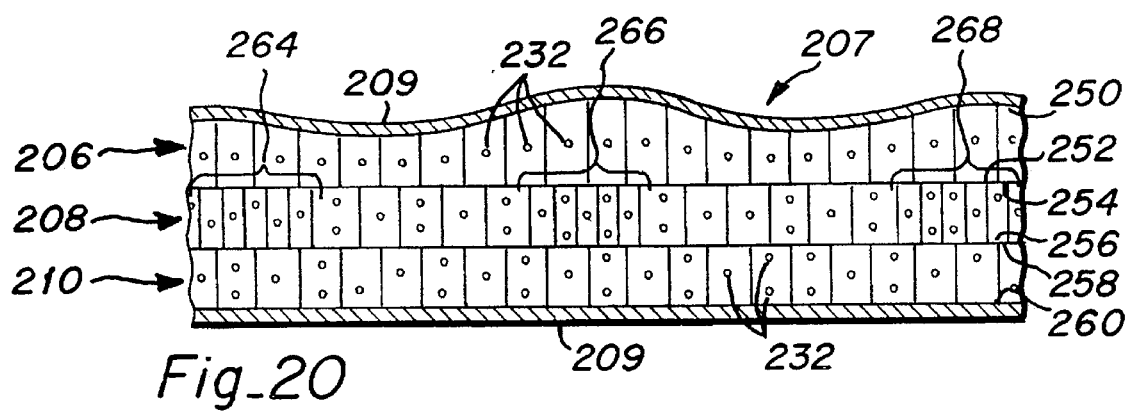
Fig_20
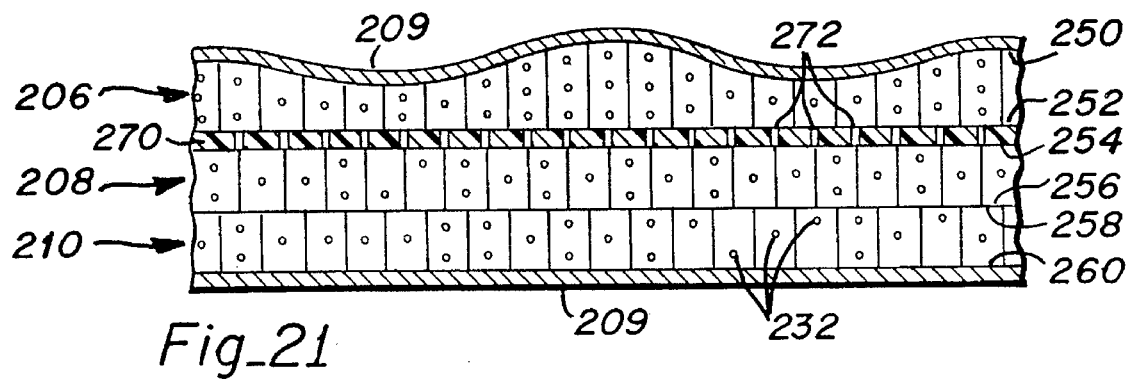
Fig_21

CONTOURED SEAT CUSHION COMPRISED OF HONEYCOMB CORES

CROSS-REFERENCE TO RELATED APPLICATIONS

This application is a continuation-in-part of our U.S. application Ser. No. 08/080,745 filed Jun. 22, 1993, now U.S. Pat. No. 5,444,881, which is a continuation-in-part of our U.S. application Ser. No. 07/974,474 filed Nov. 12, 1992, now abandoned, which is a continuation-in-part of Ser. No. 717,523, filed Jun. 19, 1991, our U.S. Pat. No. 5,180,619 entitled "Perforated Honeycomb," which is a continuation-in-part of Ser. No. 446,320, filed Dec. 14, 1989, our U.S. Pat. No. 5,039,567 entitled "Resilient Panel Having Anisotropic Flexing Characteristics and Method of Making Same."

BACKGROUND OF THE INVENTION

1. Field of the Invention

The present invention relates generally to anatomical support apparatus, and more particularly to mattresses and seat cushions having at least one thermoplastic elastomeric honeycomb panel.

2. Description of the Prior Art

Substantially immobile people (i.e. wheelchair bound users) have a great need for support cushions that minimize the development of decubitus ulcers (i.e. bedsores) that can occur during long periods of confinements to beds or chairs.

Traditionally, foam and gel-filled materials have been used in seat cushions to absorb shock, reduce pressure, and provide support for wheel chair users. There are many prior art seat cushions that are comprised of a foam cushion encased within a washable covering, wherein the foam cushion is formed so as to provide a comfortable seating surface. For example, the foam cushion may have a cut-out or contact-free zone formed through it to reduce pressure on the user's spine, coccyx (i.e. tailbone), or ischial tuberosities, or to eliminate physical contact between the cushion and particularly sensitive portions of the user's body.

In other devices, the foam is specially tapered or shaped to enable the user to easily rise from the seat. Shaping the foam in such cushions helps reduce high pressure areas and positions the user for posturing, but only if the user's anatomy fits the contours of the shaped foam. High pressure points will still occur if the user has an anatomy that does not conform to the contours of the shaped foam. This is frequently the case when the user is an amputee, or is improperly positioned on the cushion, or is changing positions on the cushion.

In yet other prior art devices, a gel or other fluid-like substance fills an impermeable sack which is disposed within or on a foam envelope. The entire assembly is encased within a moisture resistant cloth, vinyl and/or urethane, or waterproof covering and placed on a seat as a seat cushion. In some cases the gel-filled cushion is formed with contours or contact-free zones to relieve contact and pressure on sensitive portions of the user's body. For example, U.S. Pat. No. 5,191,752 discloses a seat cushion formed from silicon dielectric gel is used in an equestrian saddle. The gel cushion, although somewhat shock absorbent, is heavy and prone to damage from punctures and the like. In U.S. Pat. No. 5,201,780 a tri-layered mattress pad is disclosed. The pad includes a cover or casing containing an interior strata of a plastic film layer atop a fluid bladder layer supported on a foam layer. The pad is designed to reduce the development of bedsores by reducing normal and lateral pressures and forces on the bed user. As discussed below, there are disadvantages associated with foam and gel-filled materials.

One problem associated with gel materials is that they retain heat. During periods of continuous contact with a user's body, the temperature and moisture in the contact areas between the gel-filled cushion and the user's body also increases. An elevated gel material temperature causes user discomfort and exacerbates any existing injuries (e.g. bedsores) the user may have. The moisture increase also creates an unsanitary condition for the user because bacterial growth in the contact area is promoted and the user's injuries are likely to become infected.

Secondly, gel-filled cushions disposed in the wheelchairs of athletic users are especially uncomfortable. During outdoor athletic activity (i.e. during exposure to sunlight) or during periods of physical exercise, the temperature of the gel material reaches and remains at high levels. The gel material remains hot even when the user stops exercising and is attempting to cool down. Also, in cold weather, the gel freezes into a solid or semi-solid state.

In a gel-filled cushion, the gel tends to move (i.e. spread) away from the area under load. The user of the cushion, or his assistant, is required to "knead" (i.e. push) the gel back into the proper location beneath the user's body. This is a tiring, difficult, and inconvenient activity.

Another shortcoming of using gel-filled cushions is that the impermeable sack which contains the gel can have a hammocking effect on the user's prominences. This causes high pressure zones beneath the protruding areas resulting in sores or other injury.

Finally, gel-filled cushions are relatively heavy, and especially vulnerable to damage or destruction from puncturing.

In addition, there are shortcomings associated with foam materials which, for example, are susceptible to taking a compression set after many periods of use. It is typical, that after a prolonged period of use the foam cells collapse and the support benefit of the cushion is lost. Also, foams cushions must be encased within impermeable coverings because they readily absorb fluids. The foam cushion must be replaced if incontinence or an accidental spill wets a cushion with a torn covering.

Some wheelchair cushions utilize pneumatic devices as a pressure relieving system for reducing ischemic injury. U.S. Pat. No. 5,193,237, for example, discloses a pneumatic wheelchair cushion having a number of separate unattached air sacks arranged in a matrix. Reduced airflow and therefore reduced air pressure is periodically provided within the cushion so that each air sack will have reduced pressure for a predetermined period of time. A self-regulating air distribution is provided such that when the occupant shifts his/her weight so as to overcome the air pressure in a sack, the system automatically backflows air into that particular sack thereby cushioning the user.

The disclosed wheelchair device is complex, and requires electrical power and pressurized air. Such devices are overly complicated, costly to acquire, and costly to maintain. Also, the air cushion device must be frequently adjusted, can be punctured, and is unstable for a user.

In addition, there are some prior art mattresses that include a matrix of air cells that are inflated and deflated to more evenly support bodies and reduce the development of bedsores. In addition to the air supply components (e.g. compressor, valving, tubing, etc.) these mattresses also require a computer to constantly measure the resistance in each air cell and to control the reaction of each cell to pressure and load changes by varying the deflation and inflation in each cell. These devices are also costly, complicated, require adjustment, and subject to puncture damage.

The prior art also discloses resilient honeycomb structures used in personal-use items. U.S. Pat. Nos. 5,134,790 and 4,485,568 disclose using resilient honeycomb structures in the sole of shoes. Also, U.S. Pat. No. 4,422,183 to Landi et al. discloses a protective body shield having a honeycomb structure constructed from a resilient flexible material. Finally, U.S. Pat. No. 5,203,607 discloses an improved bicycle seat including a rigid shell supporting a foam layer having a pad of thermoplastic elastomer honeycomb disposed within or thereon. In all of these devices, the honeycomb structures are not utilized in seat cushions and mattresses.

Thus, there is a need to provide an improved anatomical support apparatus that maximizes pressure relief, stability, comfort, durability, maintainability, and weight, yet does not possess the short-comings of the presently employed devices.

SUMMARY OF THE INVENTION

Objects of this Invention

It is therefore an object of the present invention to provide an improved anatomical support apparatus that provides improved pressure relief and stability characteristics, significant compression set resistance, durability, low weight, and low maintenance properties.

It is another object of the present invention to provide an improved anatomical support apparatus having at least one thermoplastic elastomer honeycomb panel that conforms, supports, and stabilizes a wide variety of sitting positions, user anatomies and disabilities.

It is still another object of the present invention to provide an improved anatomical support apparatus that is breathable to permit cooling of the user.

Another object of the present invention is to provide an improved anatomical support apparatus that can be tailored to create the desired cushioning and stabilizing characteristics without having to introduce elements such as foam, fluids or other elements which add cost or reduce durability.

Still another object of the present invention is to provide an improved anatomical support apparatus constructed of materials that are fast drying, and can be easily disinfected and sterilized by chemical wash, microwave, detergent, or other means.

Another object of the present invention is to provide an improved anatomical support that has at least one flexible thermoplastic elastomeric honeycomb having at least one contoured surface engagable with a body area of a user.

Briefly, an improved anatomical support apparatus includes a frame for supporting the apparatus, an outer envelope and a resilient inner body encased within the envelope, both the inner body and the outer envelope resting on the frame. The inner body including a first panel having at least one honeycomb core, first and second facing sheets. The core is formed of undulated strips of resilient thermoplastic material, thermal compression bonded together to form cell walls defining a plurality of contiguous regularly shaped cells. The first facing sheet is formed of resilient thermoplastic material that is thermal compression bonded to an upper face of the core formed by upper extremities of the cell walls. The bonding is accomplished by simultaneously applying heat and pressure to the joinder of the first facing sheet and the core. The second facing sheet is similarly formed from resilient thermoplastic material and is thermal compression bonded to a lower face of the core formed by lower extremities of the cell walls, the bonding being accomplished by simultaneously applying heat and pressure to the joinder of the second facing sheet and the core. The core anisotropically flexes to stabilize and spread the load exerted by the user.

In an alternate embodiment of the present invention, an improved anatomical support apparatus includes at least one contoured substrate and at least one planar substrate attached to the contoured substrate. The contoured substrate includes a first honeycomb core formed of undulated strips of resilient thermoplastic material, thermal compression bonded together to form cell walls defining a plurality of contiguous regularly shaped cells. Each of the cell walls having an upper extremity and a lower extremity, and at least one of the upper and the lower extremity forming a contoured surface. The contoured substrate further includes means for maintaining the first core in its expanded configuration. The planar substrate is attached to one of the upper and the lower extremity of the first core, and includes a second honeycomb core formed of undulated strips of resilient thermoplastic material, thermal compression bonded together to form cell walls defining a plurality of contiguous regularly shaped cells. Each of the cell walls having an upper extremity and a lower extremity, each of the upper and the lower extremity forming a planar surface. In addition, the planar substrate also includes means for maintaining the second core in its expanded configuration. The first and the second cores being anisotropically flexible and capable of stabilizing and spreading a load exerted thereupon by said user of the cushion.

An important advantage of the present invention in that the thermoplastic elastomer honeycomb panel used in the construction of the apparatus is an anisotropic material having improved pressure relief, stability, compression set resistance, durability and low maintenance characteristics.

Another advantage of the present invention is that single or multiple thermoplastic elastomer honeycomb panels may be configured within the anatomical support apparatus to customize and individually tailor it for an individual user.

Yet another advantage of the present invention is that an anatomical support apparatus can support and conform to a wide range of user support positions, user anatomies and disabilities.

Yet still another advantage of the present invention is that entire or only portions of the anatomical support apparatus may be pressurized to create different support and stability characteristics.

Yet another advantage of the present invention is that the anatomical support apparatus may be constructed from a perforated core thermoplastic elastomer honeycomb panel and perforated faces that is breathable to allow perspiration removal and cooling of the apparatus user.

Another advantage of the present invention is that different thermoplastic elastomer honeycomb core designs or multiple panels of different thermoplastic honeycomb core designs may be utilized to maximize design flexibility of the improved anatomical support apparatus.

Still another advantage of the present invention is that the thermoplastic elastomer honeycomb core is fabricated from recyclable materials that are fast drying, and easily disinfected and sterilized.

These and other objects and advantages of the present invention will no doubt become apparent to those skilled in the art after having read the following detailed description of the preferred embodiment which is contained in and illustrated by the various drawing figures.

BRIEF DESCRIPTION OF THE DRAWINGS

In the accompanying drawings:

FIG. 1 is a perspective view illustrating a wheelchair having disposed thereon an improved anatomical support cushion constructed in accordance with a preferred embodiment of the present invention;

FIG. 3 is a partial cross-section taken through the line 3—3 of the panel illustrated in FIG. 2 to illustrate the structural characteristics of one embodiment of the panel;

FIG. 4 is a partial cross-section illustrating an alternative embodiment of the panel illustrated in FIG. 2;

FIG. 5 is a perspective view of another thermoplastic honeycomb panel of the type utilized in the improved anatomical support cushion shown in FIG. 1, wherein the panel is shown with a non-perforated facing sheet broken away to reveal a perforated honeycomb core, and also illustrated is a separate section of the panel having a perforated honeycomb core as well as a perforated facing material;

FIG. 6 is a partially broken depiction of a thermoplastic honeycomb panel, similar to the panel illustrated in FIG. 5, communicatively coupled to a bulb pump;

FIG. 7 depicts a force deflection comparison plot between a seat cushion utilizing foam or gel materials and an improved cushion having a thermoplastic honeycomb panel of the present invention;

FIG. 8 illustrates the idealized honeycomb seating cushion design parameters;

FIG. 9 illustrates the buttressing effect of the cells of a thermoplastic flexible honeycomb panel of the present invention when loaded by a wheelchair user;

FIG. 10A through 10E are cross-sectional views of the cushion illustrated in FIG. 1 wherein alternative thermoplastic flexible honeycomb panel configurations are illustrated;

FIG. 11 is a perspective view of a flexible thermoplastic honeycomb panel of the type illustrated in FIG. 1, partially broken to show a flexible honeycomb core insert disposed on a conventional foam cushion;

FIG. 12 is a cross-sectional view of the panel illustrated in FIG. 11;

FIG. 13 is a perspective view of an improved anatomical support cushion having a foam layer and a plurality of independent flexible thermoplastic honeycomb pad sections that are fitted into cavities pre-formed within the foam layer;

FIG. 14 is a perspective view of an improved anatomical support apparatus of the present invention used in a bed disposed on a standard hospital bed frame;

FIG. 15 is an enlarged perspective view of the bed including a mattress pad of the present invention; and FIG. 16 is a cross-sectional view of the bed taken along the line 16—16 of FIG. 15;

FIG. 17 is a perspective view of an alternate embodiment of the present invention including a cushion having at lease one contoured substrate made from a thermoplastic elastomeric honeycomb panel;

FIG. 18 is a partial sectional view of one embodiment of the cushion shown in FIG. 17, having a contoured upper substrate;

FIG. 19 is a partial sectional view of another embodiment of the cushion shown in FIG. 17, having a contoured intermediate substrate;

FIG. 20 is a partial sectional view of yet another embodiment of the cushion shown in FIG. 17, having a contoured upper substrate and a stiffened intermediate substrate; and FIG. 21 is a partial sectional view of still another embodiment of the cushion shown in FIG. 17, having a contoured upper substrate and a facing sheet disposed therein.

DETAILED DESCRIPTION OF THE EMBODIMENT

Referring now to FIG. 1 which depicts a conventional wheelchair 10 having disposed thereon a removable improved anatomical support cushion 12. As will be described in greater detail below, the cushion 12 is constructed of at least one flexible thermoplastic elastomer honeycomb core panel built in accordance with the present invention. It should be noted that, although the cushion 12 is particularly well suited for wheelchair applications, the cushion 12 may be used in a variety of other anatomical support applications (e.g., mattresses, automobile and airline seats, arm rests, seat belts, etc.).

Figure 2:
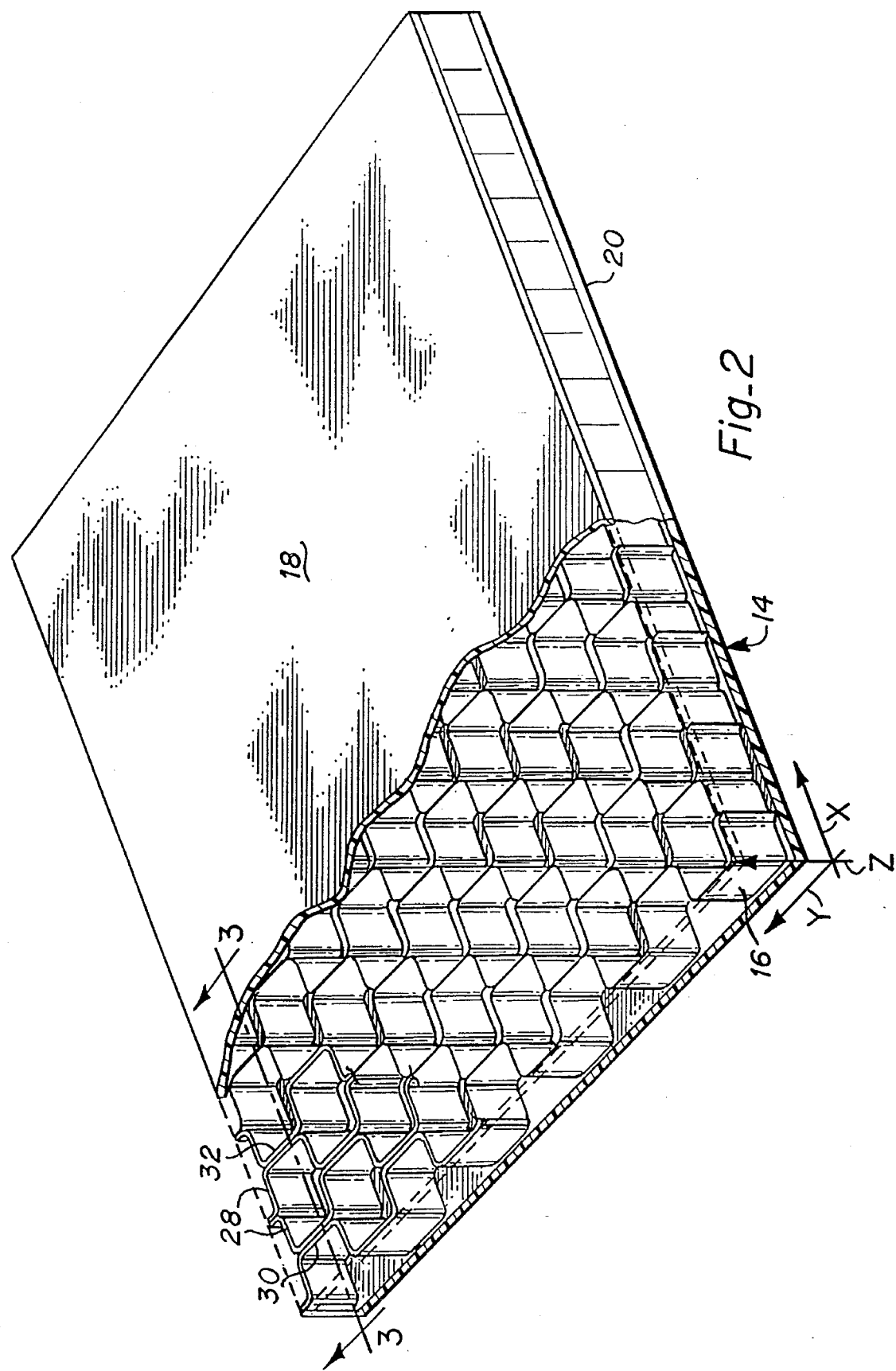
FIG. 2 is a perspective view illustrating a thermoplastic honeycomb panel of the type utilized in the improved anatomical support cushion shown in FIG. 1, wherein the panel has a non-perforated honeycomb core.

Referring to FIG. 2 which illustrates a honeycombed panel structure 14 constructed from thermoplastic elastomer materials. The panel 14 includes a honeycomb-like core preferably made of bonded together and expanded strips or ribbons 16 of plastic material to which facing sheets 18 and 20 of perhaps heavier gauge material are thermocompression bonded. The panel is an anisotropic three-dimensional structure having predetermined degrees of flex along the X, Y and Z axis. Each cell is formed, in part, by four generally S-shaped wall segments each of which is shared by an adjacent cell. In addition, each cell shares a double thickness wall segment with two adjacent cells.

Panel 14 has high tear and tensile strength and is highly resilient, with optimal compression load and shock absorption or distortion characteristics yet is extremely light weight. Selected combinations of elastomer material, honeycomb cell configurations, core thickness and facing material variables will determine the panel's characteristics of softness or hardness, resilient recovery rate and rigidity or flex as required for a particular application. The facing materials can be selected from a wide variety of films, including thermoplastic urethanes, foams, EVAs, rubber, neoprene, elastomer impregnated fibers and various fabrics, etc. The manufacturing and fabrication of the panel 14 is described in greater detail in our U.S. Pat. No. 5,039,567 and incorporated herein by reference.

FIG. 3 is a cross-sectional view taken along the line 3—3 of FIG. 2. As illustrated, each wall of the core will have a structure which resembles an I-beam, as indicated at 22, and upper and lower faces 24 and 26, either or both of which may be deformed during a planarization operation as disclosed in our above identified U.S. Patent to stabilize the honeycomb core and prevent the expanded strip from collapsing. The faces 24, 26 are firmly bonded to the facing sheets 18 and 20. In addition, as illustrated in FIG. 2, each cell will be formed of four generally S-shaped vertical wall segments 28 joined together with two wall segments 30 and 32 of double thickness. With the top and bottom edges of these walls bonded to the upper and lower facing sheets 18 and 20 a unitary honeycomb panel is provided with no seams or separations. Because of the high integrity of the bonds between the core and facing sheets, the anisotropic features of the structure will be uniform and predictable. In addition, as illustrated in FIG. 4, a multi-cored structure may be built up as depicted at 34. Such structure can include different core configurations 36 and 38 as well as different types of facing materials 40, 41, and 42. It will, of course, be appreciated that within a single core cell, dimensions may be varied by changing the dimensions and/or spacings of the bonding ribs used during the build-up of the core stack.

FIG. 5 is a perspective view of a perforated core (or perforated cell wall) honeycomb panel 44. The panel 44 is broken into two sections, a left hand section 45 and a right hand section 46 in order to more fully illustrate alternative embodiments. The left half 45 shows material having a perforated honeycomb core 48 and unperforated or solid facing sheets 49 and 50. The dashed lines 51 illustrate the normal full coverage of the top facing sheet 49.

The honeycomb core 48 is made from sheets of a selected grade thermoplastic elastomeric material that has been perforated such that a matrix of small holes 59 exists throughout. The sheets are compression bonded together in spaced intervals staggered between alternating sheets as described in our U.S. Pat. No. 5,039,567 and incorporated herein by reference. The resulting stack is then cut into strips which, when expanded, create a honeycomb network of elongated, generally hexagonally shaped cells 52.

Each cell 52 of the honeycomb core 48 is defined by four generally S-shaped wall segments, each interior wall of which is shared by an adjacent cell. The wall segments of each cell 52 include a single thickness wall portion 54 and a double thickness wall portion 56.

The upper and lower faces 58 and 60 of the walls forming several cells are deformed during a planarization operation as disclosed in our above-identified U.S. Patent to stabilize the honeycomb core and prevent the expanded strip stock from collapsing. Facing sheets 49 and 50, cut from sheets of resilient thermoplastic material, are then compression bonded to the upper and lower faces 58 and 60. The addition of the facing sheets 49 and 50 strengthens the core 48 and provides an ample surface for adhering another panel or other material.

The right half section 46 of the panel depicted in FIG. 5 includes a perforated honeycomb core 47 similar to the left hand section 45 of the panel, but has facing sheets 55 and 53 made of perforated material. Dashed lines 57 indicate the honeycomb pattern of the core 47 underneath the top facing sheet 55. By perforating both the honeycomb core and facings, the weight of the material is reduced while the resiliency and flexibility is increased. The weight is reduced because the perforations reduce the overall quantity of the material comprising the honeycomb and facings. Similarly, the flexibility is increased because there is less material to constrain each segment of the material from bending. The resiliency, or ability of the structure to spring back to its original form after being compressed, is also enhanced by virtue of the additional passages through which air can return to fill the cells. It will be appreciated that the resilient but damped restorative characteristics of the structure make it an excellent absorber of shock waves.

Referring now to FIG. 6 which depicts a pressurized honeycomb panel 62 including a pump subsystem 63, and a perforated core honeycomb panel subsystem 64.

The subsystem 64 includes a first facing sheet 66, a second facing sheet 68, and a flexible perforated honeycomb core 70. The core 70 is described in greater detail in our U.S. Pat. No. 5,180,619 which is hereby incorporated by reference. The core 70 includes cell walls 71 with perforations 72 and is affixed to the inside surfaces of the first facing sheet 66 and the second facing sheet 68. The facing sheets extend outwardly beyond the core 70 and are bonded together around their perimeters as indicated at 74 so as to form an enclosed chamber 76 which is hermetically sealed and adapted to contain a suitable gas. For purposes of illustration, the chamber walls are broken away as indicated at 78.

In order to permit the gas contained within the enclosed chamber 76 to be increased or decreased in volume or pressure, the pump subsystem 63 is communicatively coupled to the chamber 76. The subsystem 63 includes a bulb pump 80 that is coupled via a conduit 81 to the chamber 76. An exhaust valve 82 is installed in the conduit 81 and allows the chamber 76 to be vented to atmosphere. As will be appreciated by those skilled in the art, the selected addition or subtraction of gas into or out from the enclosed chamber 76 will result in a change in the force-dissipating characteristics or shock absorbing capabilities of the panel in response to applied forces such as illustrated by the arrow 83.

Honeycomb, and particularly anisotropic honeycomb has a number of beneficial characteristics for anatomical support applications in general, and particularly for mattress and seating applications where the disadvantages of more traditional materials, such as gels and foams, become particularly unacceptable. Important characteristics for general seating, and especially for wheelchair seating materials, include pressure relief (load spreading), comfort, stability, durability, low maintenance, light weight, and low transmissibility (good impact isolation).

Pressure relief is particularly important for wheelchair seating applications because local pressure spots, within the range of 60–80 mm Hg (1.16–1.55 psi), quickly develop into sores on relatively immobile people. Seat cushions having honeycomb panels of the present invention are ideal for use as wheelchair cushions because such panels have relatively flat force deflection characteristics.

FIG. 7 shows a force-deflection plot 84 of a foam cushion compared to a force deflection plot 86 of a cushion having a honeycomb panel of the present invention. The modulus (i.e. compressive force divided by deflection) over a 15 to 55 percent deflection range, for foam is depicted by a line 88. The modulus, over the same deflection range, for honeycomb of the present invention is depicted by a line 89. The figure shows that the modulus for the honeycomb panel cushion is approximately one-fourth that of the foam cushion. Pressure variations, in the honeycomb panel cushion caused by anatomical features (i.e. protrusions) of the wheelchair user, are approximately one-fourth those of foam cushions. Thus, a wheelchair user's anatomical protrusions are less likely to cause local high pressure spots and bed sores if the user sits on a honeycomb panel cushion of the present invention rather than on a typical foam cushion.

The characteristic of honeycomb that makes it an ideal in this area is the relatively flat "plateau region" that characterizes the honeycomb panel's force-deflection property. In FIG. 8, a force-deflection relationship or line 90 is plotted for honeycomb constructed in accordance with the present invention. The force-deflection line 90 is measured over a useable deflection range 91 that ranges from 0 to nearly 80 percent deflection. It will be noted from the figure that there are three distinct regions in the force-deflection line. There are two regions where the modulus (i.e. slope) of force over deflection is very steep, that is, the modulus one region 92 and the bottoming region 94. However, in the plateau modulus region 93, which extends over the plateau region deflection range 95 (i.e. roughly 8–75 percent deflection), the slope of the line is relatively flat. If the honeycomb configuration is properly selected such that the weight of the wheelchair user divided by his sitting area places the user in the middle of the plateau modulus region 93 then local increases or decreases in cushion deflection caused by the user's anatomical features do not appreciably change the pressure exerted on the user. In other words, the user's anatomical protrusions do not create the local high pressure spots which could lead to bedsores and other similar ulcerations. In engineering terminology, the compressive modulus of honeycomb constructed in accordance with the present invention, is less over the plateau region 93 than the compressive modulus of typical foam or gel seat cushions.

Pressure relief by itself is not sufficient to make a satisfactory wheelchair seating cushion because stability must also exist. The best pressure relief system is ineffective if during maneuvers or motions the user tips or slides off the seating area of the cushion. FIG. 9 depicts the self-aligning and supporting characteristic of honeycomb panels of the present invention. A user profile 96 is illustrated as being disposed onto a seat cushion 97 constructed from a honeycomb panel of the present invention. As depicted at 98, in response to the user load, the honeycomb cells tend to align themselves in a buttressing manner with the applied load, even as the load shifts. This effect can be enhanced by selecting a softer honeycomb for the topmost layer of the cushion, in effect creating a buttressed pocket for the lateral portions of the thighs and buttocks. In addition, the anisotropic flexing characteristics of a single and double walled honeycomb provide enhanced stability (i.e. greater shear modulus) in the direction of the double walls. Depending on the needs and activity level of the user, this orientation can be changed to provide the most effective support. For a typical user (this would be support in the fore and aft orientation to help prevent slumping or sliding off the cushion.

Another principal benefit of the honeycomb cushion characterized by the present invention is the ability to tailor it (e.g. varying materials, varying cell configuration and size, etc.) to create the desired cushioning and stabilizing characteristics. The honeycomb panel may be tailored either by adding other components, e.g. fluids, or by not introducing elements such as fluids, foam, or other elements which add costs and reduce durability. As an example, one or more layers of the honeycomb cushion can contain perforated cells walls, which in effect creates a configuration that breathes like an open cell foam but without the foam's porosity and resultant susceptibility to absorbing liquids. A perforated cell honeycomb can provide performance benefits such as quicker recovery from loading and a lower modulus with greater displacement capability than the same configuration in enclosed cell honeycomb. In conjunction with the inflation device and valve arrangement, as illustrated in FIG. 6, the perforated cell cushion with sealed edges can be pressurized to increase the air cushion effect in situations where this is beneficial. Note that a perforated honeycomb air cushion is much more shear resistant, thus more stable, than an equivalent conventional air cushion.

Compression set resistance and resistance to repeated loadings, i.e. good material memory, are also important benefits of a seat cushion having honeycomb of the present invention. The compressive resistance and recovery of both honeycombs and foams comes from bending of the "strut elements" which comprise their geometries. These strut elements are more uniform in honeycomb than foam. Because of this greater uniformity, the compression set resistance and recovery is greater in honeycomb than in foam. In addition, closed cell (faced) honeycomb has the additional resilience afforded by the integral trapped air creating an air spring. Comparison testing of honeycomb and foam configurations used for seating applications in which comparable samples were loaded daily for 16 hours on and 8 hours off, revealed 1.5 to 2.0 percent compression set for the foams compared to less than 1 percent for honeycombed seating cushions of the present invention.

Also, the honeycomb seating cushions of the present invention are light weight and require low maintenance. Weight is an important factor during transfer operations of the wheelchair into and out of a vehicle. Low maintenance and ease of cleaning are important because a wheelchair cushion cannot necessarily be quickly replaced if incontinence or an accidental spill wets the cushion. Honeycomb panels of the present invention typically have solid facing sheets which act as washable barriers that will not absorb water like foam cushions. Nor are honeycomb panels susceptible to puncturing like some of the gel-filled cushions currently available.

Figure 10D:
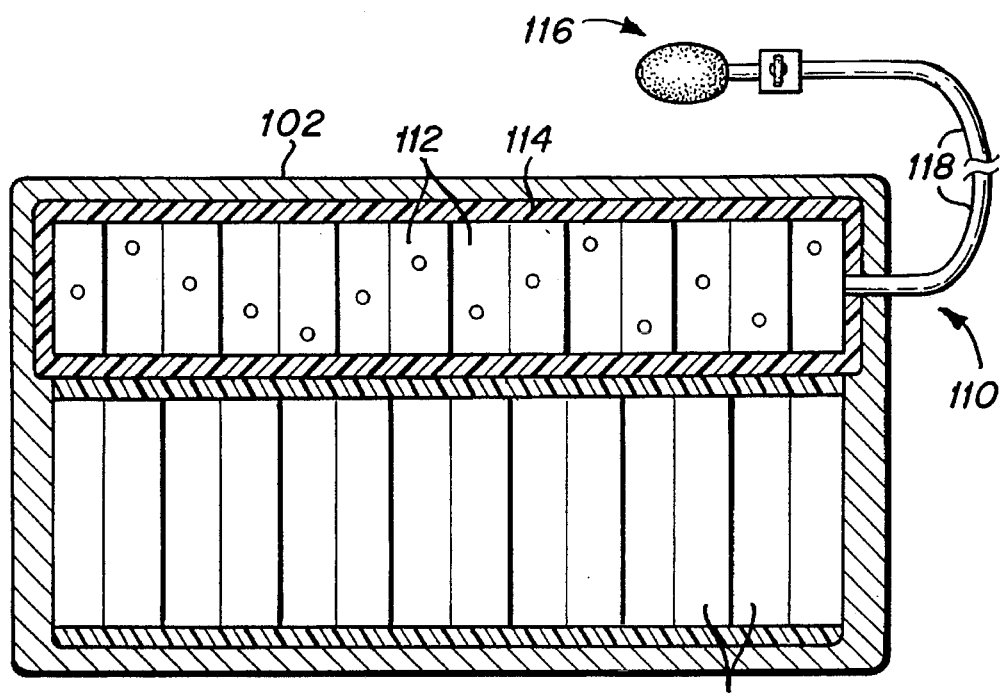

Referring now to FIG. 10A through 10E wherein are depicted cross sectional views of an improved cushion in accordance with the present invention. FIG. 10A depicts a single flexible honeycomb panel 100 encased within a vinyl or similar covering 102. The panel 100 is constructed in accordance with the referenced U.S. patents and includes a non-perforated core 104, and facing sheets 103 and 105. Although a single unperforated cell wall honeycomb panel is illustrated it will be appreciated that in the alternative a single perforated core honeycomb panel may be used as an alternative embodiment.

In an alternate embodiment not shown, the panel 100 could be removed from the covering 102 and either or both of the facing sheets 103 and 105 perforated in a predetermined pattern. The area of the perforations could be varied depending on the specific requirements of the user. For example, if a particular user needed greater cushioning for a certain region of his body, the facing sheets for the cushion area supporting this body region could be perforated. In this manner, the cushion apparatus can be individually customized to a user's specific needs. Perforating the cushion in a predetermined manner to accommodate specific user requirements can be utilized for any embodiment of the present invention.

Referring to FIG. 10B which illustrates two perforated core honeycomb panels 106 and 108 encased within the covering 102, it should be noted that honeycomb panel 106 is of different size cell construction than honeycomb panel 108, panel 108 having larger cell walls as illustrated in the figure. Further, although an embodiment with two different honeycomb panels has been illustrated it is possible to construct the cushion with two equally sized honeycomb panels. Alternately, different types of honeycomb panels may be mixed according to the supporting properties desired. For example, panels having different core designs (i.e., cell size, configuration, or materials) may be used. Also, a non-perforated cell wall honeycomb panel may be configured with a perforated cell wall honeycomb panel and vice versa. In addition, two or more layers of honeycomb panels may be stacked in accordance with the descriptions referenced earlier in our prior U.S. patents.

Referring to FIG. 10C which depicts an improved cushion having a pressurized honeycomb panel 110 encased within the covering 102. As described earlier, the pressurized honeycomb panel 110 is comprised of a perforated honeycomb core 112, encased within a non-perforated facing sheet covering 114, that is in communication with a pump subsystem 116, via a conduit 118. In this manner, the pressurized honeycomb panel 110 may be alternatingly pressurized to vary the support characteristics of the honeycomb core 112 contained within.

Referring to FIG. 10D which illustrates a multi-layer cushion having a plurality of honeycomb panels contained within a covering 102. In this particular embodiment, the pressurized honeycomb panel 110 is attached to a non-perforated core honeycomb panel 120. Alternately, two pressurized honeycomb panels could be used with each panel system having different properties, i.e. different materials and/or cell configurations and sizes. In addition, each individual panel could have different stiffnesses in different areas. For example, a stiffer area would be placed in a forward area where the user's legs and thighs are supported, and a softer area placed beneath the buttocks area. This can be accomplished by constructing the panels with more than one cell configuration. In another embodiment not depicted in the figure, the panel 120 could have perforated cells walls rather than non-perforated cell walls as illustrated. Finally, although two honeycomb panels are depicted, more than two panels could be employed, and the arrangement of panels could have a pressurized panel disposed between non-pressurized panels or a non-pressurized panel disposed between two pressurized panels.

Figure 10E:
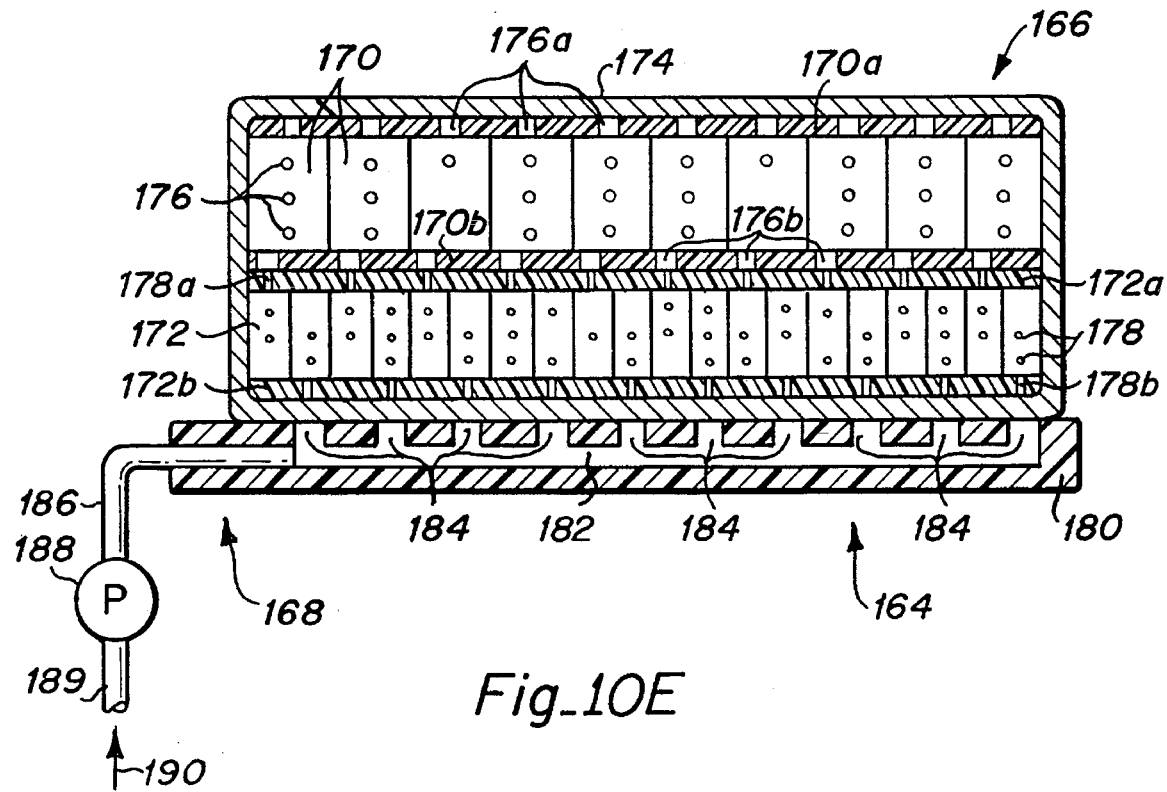

FIG. 10E illustrates a multi-layer apparatus 164 having a two-layer panel subsystem 166 disposed onto a pump subsystem 168. The panel subsystem 166 includes pressurized honeycomb panels 170 and 172. Each panel has perforated cell walls 176, 178 and facing sheets 170a and 170b, 172a and 172b. Each facing sheet has a plurality of perforations 176a and 176b, and 178a and 178b. The two panels 170 and 172 are covered by a permeable covering 174 that permits the passage of fluid (e.g. air) from the panels 170 and 172. The pump subsystem 168 includes a base plate 180 having a channel 182 formed therein so that the channel can be communicatively coupled, via a conduit, to a pump or fan device 188. A plurality of exhaust ports 184 are formed in a surface of the base plate 180 and intersect with the channel 182. The pump device 188 is also communicatively coupled to a fluid source (not shown) via an input conduit 189.

Fluid (e.g. air) is drawn from the fluid source, in the direction indicated by the arrow 190, by the pump device 188. Fluid is passed through the conduit 186 into the channel 182 and out through the ports 184 of the base plate 180. The fluid passes through the contacting permeable covering 174 and into the panel 172, via the perforations 178b in the facing sheet 172b. The fluid passes from the panel 172 to the panel 170 via the perforations 178, 178a, and 176b. Finally, the fluid exits the panel 170, via the perforations 176 and 176a, out through the permeable covering 174. The fluid exiting from the apparatus cools and comforts a user sitting thereon.

It will be appreciated that only one panel or even additional panels may be utilized to maximize the comfort and support for a particular user. Also, a perforated covering may be used in lieu of the permeable covering 174. Further, the pump device 188 may draw from a variety of fluid sources other than the ambient environment.

Although not illustrated, an alternate pump subsystem may include a pump device communicatively coupled to a porous conduit. The conduit being similarly disposed as the base plate 180 or, in the alternative, the conduit could be disposed underneath the uppermost panel (e.g. between panels 170 and 172) for supplying cooling air through panel 172 to the user.

FIG. 11 illustrates a partially broken view of yet another alternative embodiment of an improved cushion 122. The cushion 122 includes a honeycomb core 126, facing sheets 128 and 129, a foam pad 130, all encased within a covering 124. As more clearly illustrated in FIG. 12, the honeycomb core 126 is disposed on top of the foam 130. Although a non-perforated honeycomb core is illustrated, a perforated cell wall honeycomb core could be utilized, or alternatively a pressurized honeycomb panel system could be utilized. FIG. 13 illustrates still another embodiment of the seat cushion 122 wherein a plurality of cavities 132 and 134 are disposed on the surface of the seat cushion 122. Within each cavity a separate honeycomb core insert 136 is placed. The particular inserts illustrated in FIG. 13 are non-perforated cell wall honeycomb core inserts with top and bottom facing sheets 138, 140. In the alternative, the core inserts 136 could be constructed from perforated cell wall honeycomb panels or pressurized honeycomb panels. Although only two core inserts have been illustrated in the figure, a plurality of core inserts could be installed on numerous locations on the surface of the cushion to vary the support characteristics of the cushion to conform to the individual needs of the wheelchair user. Thus, core inserts of varying stability and stiffness could be interchanged to individually tailor the support and pressure relief characteristics of the cushion. Although not illustrated, in a multi-layer cushion apparatus, the core inserts could be removable from any of the panels (i.e. in a three layer apparatus, the core insert could be removable from the second panel).

A logical extension of the anatomical support cushion described above is a pad used for supporting the buttocks, shoulders, head, and other parts of the anatomy of a reclining or sitting user. FIG. 14 is a perspective view of a bed 142 supported on a standard hospital bed frame 144, the bed 142 having carrying straps 146 disposed at numerous location around its periphery. The bed 142 of the present invention is not limited to use in a hospital environment but may be used in other human care facilities (e.g. nursing, convalescent, retirement homes, etc.) or other environments.

FIG. 15 depicts an enlarged perspective view of the bed 142 illustrated in FIG. 14, but with the carrying straps 146 omitted for clarity. The bed 142 includes a mattress 150 with a mattress pad 148 dispose thereon and which covers the entire mattress 150. It will be appreciated, however, that the mattress pad 148 could be sized such that it covers only a portion or discrete portions of the mattress 150. As illustrated in the cutaway portion, the mattress pad 148 includes a honeycomb core panel 152 having a facing sheet 154 and a facing sheet 160 (not shown). The honeycomb core panel 152 can be configured in ways different than the type illustrated, i.e. perforated cell walls, unfaced honeycomb core, etc.

FIG. 16 is a cross-sectional view taken along the line 16—16 of FIG. 15, and depicts the construction of the mattress pad 148 and mattress 150. The mattress 150 includes a foam core 156 encased within a mattress covering 158. The mattress pad 148 includes the honeycomb core panel 152, facing sheets 154 and 160, and a pad covering 162 encasing the panel 152 and facing sheets 154 and 160.

FIG. 17 is a perspective view of a contoured seat cushion 200 which is an alternate embodiment of the seat cushion 12 depicted in FIG. 1. Seat cushions, fabricated from at least one panel of flexible thermoplastic elastomeric honeycomb and having a planar or non-contoured surface engagable with a body surface (e.g., thighs, buttocks) of a user, provide pressure relief, stability, durability and washability. However, a planar engagable surface does not provide as much positioning and posture control of the user as does a non-planar or contoured engagable surface.

The contoured seat cushion 200 includes an upper layer 206, an intermediate layer 208, and a bottom layer 210. Each layer is fabricated from thermoplastic elastomeric honeycomb in the manner described above, and the construction of each of the cells of the honeycomb panels of the layers is also as described above. Each cell wall of each layer has an upper extremity and a lower extremity (best seen in FIG. 18–21). The intermediate layer 208 is sandwiched between the layers 206 and 210 and is attached to the lower extremity 252 and the upper extremity 258 of the upper layer 206 and the bottom layer 210, respectively.

In addition, a surface 205 formed by the upper extremities 250 of the cell walls of the upper layer 206 has been sculpted or shaped to provide the distinctive illustrated contoured features depicted in FIG. 17. The directional terminology adapted for the cushion 200 is also illustrated in FIG. 17. A direction 201 is designated as "left", a direction 202 is "right", direction 203 is "rear", and a direction 204 is "front".

A central rear portion of the surface 205 of the cushion 200 has been formed with a coccyx cutout depression region 212 which prevents pressure buildup on a sensitive coccyx (i.e. tailbone) which cannot take as much pressure as other areas of the user's body. An ischial dishing depression region 214 is formed forward of the cutout region 212. The ischials are a pair of bones forming the dorso-posterior portion of the pelvis; the interior part of the human pelvis upon which the body rests during sitting. A trochanter shelf is a slightly concave region formed in the surface 205. One shelf is disposed to the left (shelf region 218) and one shelf is disposed to the right (shelf region 216) of the ischial dishing region 214. The trochanter is a projection on the proximal end of the femur.

An adductor shelf region 228 is an upwardly curved region formed on the surface 205 and is disposed along the center line of the seat cushion 200 and spaced generally equidistant from the left and the right edges of the cushion 200. A left abductor region 220 is an upwardly curved region formed on the surface 205 and disposed to the left of the region 228. Similarly, a right abductor region 222 is formed on the surface 205 to the right of the region 228. Leg troughs 224, 226 are formed on the surface 205 and flank the region 228 on the left and the right sides, respectively. Posturing or positioning problems include abduction or adduction of the legs (the legs are either too far apart or too close together).

The ischial dishing region 214, the abductor regions 220, 222, and the adductor region 228 perform positioning or posture control of a user of the contoured wheelchair seat cushion 200. The abductors and adductors are essentially side bolsters and a pommel, respectively, designed to prevent the user's legs from sliding around and prevent the user's knees from banging together. The dishing region 214 allows the ischials of the user to engage the surface 205 of the cushion 200 without restriction and sink into a natural, anatomic position thereby alleviating the tendency for posterior tilt, or slouching of the pelvis. The rear dishing in the back is designed to evenly support the user's pelvis so that it remains upright and straight. This provides a stable foundation and a greater balance for the user who has limited or no use of his lower truck muscles.

The ischial dishing region 214 and the abductor regions 220, 222 and adductor region 228 also provide for increased stability for the user of the seat cushion. As described above, seat stability is particularly critical for wheelchair users. A cushion which provides a stable seating platform enhances the user's ability to wheel and turn the wheelchair by grasping the wheels, to get in and out of the chair, and to perform other dynamic movements. A cushion which provokes non-stability or a fear of falling from the chair will inhibit the user's range of movement. Thus, the dishing region 214 and the adductor region 228 and abductor regions 220, 222 provide the lateral support that is needed for the user under dynamic conditions.

As described above, the nature of a thermoplastic elastomeric flexible honeycomb panel is that it enhances the pressure relief capability of the cushion. This pressure relief capability is further enhanced by contouring or shaping the surface 205 that is engageable with the body surface of the wheelchair user. For example, the ischial dishing region 214 increases the contact area with the buttocks and upper thighs of the user. Since the user's weight is distributed over a larger area, the cushion material undergoes less deflection to conform to the body, therefore, the resistive force is less. This translates into reduced pressures over a wider contact area. The coccyx cutout region 212 prevents pressure build up on the sensitive tailbone which cannot take as much pressure as other areas. Also, the shelf regions 216, 218 cradle the trochanters (the bony protuberances extending from the upper part of the femur) for added support which relieves pressure from the ischials. Further, the shaped leg troughs 224, 226 increase the contact area with the user's thighs thereby distributing the user's weight over a larger area and more evenly distributing the pressure on the cushion.

In addition, using an elastomeric flexible material avoids hammocking. Hammocking is defined as a suspension of the bony prominences of the user on the surface of the cushion preventing total conformation of the cushion to the user's body, thereby preventing complete pressure equalization. Using an elastomeric material allows the upper or contact surface 205 of the cushion to stretch in response to pressure from the bony prominences of the user, thereby distributing the pressure over a larger area.

Also, the wheelchair cushion 200 is extremely durable. Because of the existing contour, the material in the cushion experiences less compressive deflection and fatigue, while remaining resilient longer.

However, it should be noted that the cells of the honeycomb panel of the cushion 200 could be oriented as shown by the cells in the region 230 or as shown by the cells in the region 240. That is, the double wall portions 234 of the cells in the region 230 may be aligned in the front-rear direction. Alternately, the double wall portions 244 of the cells in the region 240 may be aligned in the left—right direction. In either case, the walls 241 or 231 of each of the cells are perforated with perforations 242 or 232. Perforating the cell walls of the cells of each of the layers 206, 208, 210 enables the seat cushion 200 to be lightweight and washable, and also permits cooling air to pass beneath the user thereby providing a comfortable seating surface. In addition, the open or bare faced honeycomb layers allow moisture to drain through the cushion thereby keeping the uppermost layer 206, i.e. the layer engagable with the skin of the user, dry.

FIG. 18 is a partial sectional view of a contoured seat cushion 201 having a generally similar construction to the cushion 200 (FIG. 17). The cushion 201 includes the upper layer 206 having an upper extremity 250 and a lower extremity 252. A contoured or non-planar surface is formed by the upper extremity 250 of the cells of the upper layer 206. In contrast, the upper extremity 254 and the lower extremity 256 of the intermediate layer 208 is planar. Similarly, the upper extremity 258 and the lower extremity 260 of the bottom layer is planar. The figure, the upper extremity 254 of the layer 208 is attached to the lower extremity 252 of the upper layer 206. Similarly, the upper extremity 258 of the bottom layer 210 is attached to the lower extremity 256 of the intermediate layer 208. The three layers 206, 208, 210 are encased within, but not bonded or attached to, a stretchable, breathable and permeable casing 209, thereby permitting the attached layers 206, 208, 210 to be removed and washed and cleaned apart from the casing 209. The casing 209 may be formed with vents (not shown) to enhance its breathability and permeability. It should be noted that wetness or moisture (from user incontinence or otherwise) drains through the cushion, via the unfaced layers 206, 208, 210, and the permeable casing 209, to keep moisture away from the user's skin.

FIG. 19 is a partial sectional view of a contoured seat cushion 203, which is generally similar to cushion 200 (FIG. 17) The upper extremity 254 of the intermediate layer 208 forms a non-planar or contoured surface. The upper extremity 254 is attached to the lower extremity 252 of the upper layer 206 thereby causing the upper extremity 250 of the upper layer 206 to be disposed in a non-planar or contoured manner. Thus, a body portion of the user will engage a contoured or non-planar surface. It will be appreciated, that the bottom layer 210 could have a contoured upper extremity 258 in addition to or in lieu of the extremity 254. Alternately, the lower extremities of either the intermediate layer 208 or the bottom layer 210 could be contoured thereby causing the upper extremity 250 of the upper layer 206 to be non-planar.

FIG. 20 is another embodiment 207 of the contoured seat cushion illustrated in FIG. 17. In this embodiment three bolstering or reinforcing regions 264, 266, and 268 are formed in the intermediate layer 208. In the regions 264, 266, 268, as compared to the other portions of the cushion 207, the cell size may be reduced, or the thermoplastic material comprising the cell walls may be made from a stiffer material (e.g. higher durometer) or, the cell walls may be constructed from ribbons having greater thickness. The effect is to provide a stiffer region for supporting the upper layer 206. In this manner, for example, if the regions between the reinforcing regions were constructed of a less stiff or more flexible material, then the user and his bony prominences would sink between the reinforcing regions which would perform the same functions as a upwardly contoured bolster or other similar device. Also, the cells in the bolster regions are less prone to collapse or roll over as the user leans to one side. It will be appreciated as an alternate to the illustrated embodiment, the reinforcing regions could be placed in either the upper or the bottom layers.

FIG. 21 is a sectional view of yet another embodiment of the contoured seat cushion in FIG. 17. In this embodiment, a thermoplastic elastomeric facing sheet is disposed between the upper and the intermediate layers 206, 208. The facing sheet 270 is formed with a plurality of perforations 272 to allow air and fluid to flow from one layer to the other. For example, cooling air can flow from the bottom layer to the upper layer and ultimately to the user. It will be appreciated, that the facing sheet could be disposed between the intermediate and the lower layers.

It will also be appreciated that the cell walls of any of the layers of any of the embodiments 201, 203, 207 of FIG. 18, FIG. 19 and FIG. 20 respectively could be unperforated.

Although preferred, and alternate embodiments of the present invention have been disclosed above, it will be appreciated that numerous alterations and modifications thereof will no doubt become apparent to those skilled in the art after having read the above disclosures. For example, the anatomical support cushions may be configured in any appropriate shape, with multiple panels and with various combinations of perforated and non-perforated core panels, and with core walls and/or face sheet perforations the number and/or hole size of which are tailored to achieve desired damping characteristics. It is therefore intended that the following claims may be interpreted as covering all such alterations and modifications as fall within the true spirit and scope of the invention.

What is claimed is:

1. An improved seat cushion comprising:
   a) at least one contoured substrate including
      i) a first honeycomb core formed of undulated strips of resilient thermoplastic material, thermal compression bonded together to form cell walls defining a plurality of contiguous regularly shaped cells, each of said cell walls having an upper extremity and a lower extremity, at least one of said upper and said lower extremity forming a contoured surface, and
      ii) means for maintaining said first core in its expanded configuration, said first core being anisotropically flexible and capable of stabilizing and spreading a load exerted thereupon by a user of said cushion;
   b) at least one planar substrate attached to one of said upper and said lower extremity of said first core, said planar substrate having
      i) a second honeycomb core formed of undulated strips of resilient thermoplastic material, thermal compression bonded together to form cell walls defining a plurality of contiguous regularly shaped cells, each of said cell walls having an upper extremity and a lower extremity, each of said upper and said lower extremity forming a planar surface, and
      ii) means for maintaining said second core in its expanded configuration, said second core being anisotropically flexible and capable of stabilizing and spreading a load exerted thereupon by said user of said cushion; and
   c) whereby predetermined prominences of said user's body are received in said contours formed in said contoured surface.

2. An improved seat cushion as recited in claim 1, wherein said means for maintaining of each said first and said second honeycomb cores includes:
   (a) a planarizing thermal compression deformation of a first face of said core formed by said upper extremity of said cell walls.

3. An improved seat cushion as recited in claim 2, wherein said means for maintaining of each said first and said second honeycomb cores includes:
   (a) a planarizing thermal compression deformation of a second face of said core formed by said lower extremity of said cell walls.

4. An improved seat cushion as recited in claim 3, wherein said means for maintaining of each said first and said second honeycomb cores further includes:
   (a) a first facing sheet of said resilient thermoplastic material bonded to said first face.

5. An improved seat cushion as recited in claim 4, wherein said means for maintaining of each said first and said second honeycomb cores further includes:

(a) a second facing sheet of said resilient thermoplastic material bonded to said second face.

6. An improved seat cushion as recited in claim 5 wherein said cell walls of at least some of said cells of said first core have perforations therein.

7. An improved seat cushion as recited in claim 6 wherein said cell walls of at least some of said cells of said second core have perforations therein.

* * * * *